(12) United States Patent
Wu

(10) Patent No.: US 7,571,919 B2
(45) Date of Patent: Aug. 11, 2009

(54) POSITIONING DEVICE FOR A BICYCLE HANDLEBAR

(76) Inventor: Pi-Hsiang Wu, No. 108, Sinhe Rd., Sinfong Township, Hsinchu County 304 (TW)

( * ) Notice: Subject to any disclaimer, the term of this patent is extended or adjusted under 35 U.S.C. 154(b) by 515 days.

(21) Appl. No.: 11/382,113

(22) Filed: May 8, 2006

(65) Prior Publication Data
US 2007/0257465 A1 Nov. 8, 2007

(51) Int. Cl.
*B62K 21/08* (2006.01)
(52) U.S. Cl. ........................ 280/272; 280/279
(58) Field of Classification Search ............ 280/272, 280/279, 280
See application file for complete search history.

(56) References Cited
U.S. PATENT DOCUMENTS

| | | | | |
|---|---|---|---|---|
| 432,920 A | * | 7/1890 | Wittlig | 280/272 |
| 528,874 A | * | 11/1894 | Hall | 280/272 |
| 579,664 A | * | 3/1897 | McConley | 280/272 |
| 5,516,133 A | * | 5/1996 | Motrenec et al. | 280/272 |
| 7,011,324 B2 | * | 3/2006 | Salonia et al. | 280/272 |
| 2008/0136137 A1 | * | 6/2008 | Huang | 280/272 |

\* cited by examiner

*Primary Examiner*—Kevin Hurley
(74) *Attorney, Agent, or Firm*—Banger Shia

(57) ABSTRACT

This invention discloses a positioning device for a bicycle handlebar, wherein a pressing assembly, which is mounted on a front tube, is operated by the user so that it can be pressed against a positioning member, which is fixed to a front fork stem. Since the positioning member is flexible, an elastic resilience relative to the direction of pressing will be produced when the positioning member is pressed to resist the pressing force and the elastic resilience that comes in a reverse direction. As a result, the positioning member and the pressing assembly will be pressed to be positioned. Hence, the front tube will not pivotally rotate relative to the front fork stem, and the bicycle handlebar can be positioned in such a way that the bicycle is unlikely to fall, which also protects the members of the bicycle.

7 Claims, 11 Drawing Sheets

POSITIONING DEVICE FOR A BICYCLE HANDLEBAR

BACKGROUND OF THE INVENTION

1. Field of the Invention

The present invention relates to a bicycle handlebar, and more particularly to a positioning device for a bicycle handlebar that can fix the direction of the handlebar when parking the bicycle.

2. Description of the Prior Art

When parking a bicycle, a stand mounted on a rear wheel is usually used to rest the bicycle on the ground by supporting the bicycle, so that the bicycle is inclined toward one side or the rear wheel is jacked off the ground.

When a bicycle is positioned, the handlebar usually rotates toward one side. Because of the restriction of the brake cable of the handlebar, the front wheel will not rotate excessively. However, when the handlebar is mounted with a heavy device, or pushed by external forces, the bicycle will rotate about the stand of the rear wheel. If the rotation angle of the handlebar exceeds 45 degrees, the bicycle will fall over, damaging the bicycle and/or the device mounted on the bicycle.

Accordingly, when parking a bicycle a positioning device for a bicycle handlebar is needed for positioning the handlebar to a predetermined angle to protect the members of the bicycle, and the device mounted on the bicycle.

The present invention has arisen to mitigate and/or obviate the afore-described disadvantages.

SUMMARY OF THE INVENTION

The primary objective of the present invention is to provide a positioning device for a bicycle handlebar, wherein the handlebar can be positioned to a predetermined angle.

The further objective of the present invention is to provide a positioning device for a bicycle handlebar comprising a positioning piece and a pressing assembly, mounted on a front tube and a front fork of a bicycle, wherein the positioning piece is flexible, defined with a through hole in the center thereof for receiving the front fork stem, thus positioning the positioning piece to the front fork stem. The pressing assembly is fixed to the front tube and abutted against the lower surface of the positioning piece; with such an arrangement, the front tube will not be pivoted relative to the front fork stem.

As far as the above-mentioned device is concerned, the pressing assembly is mounted on the front tube to be operated by the user so that it can be pressed against the positioning piece, which is fixed to the front fork stem. The front tube, therefore, will not pivotally rotate relative to the front fork stem; and the bicycle handlebar can be positioned in such a way that the bicycle is unlikely to fall over, and thus protects the members of the bicycle.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
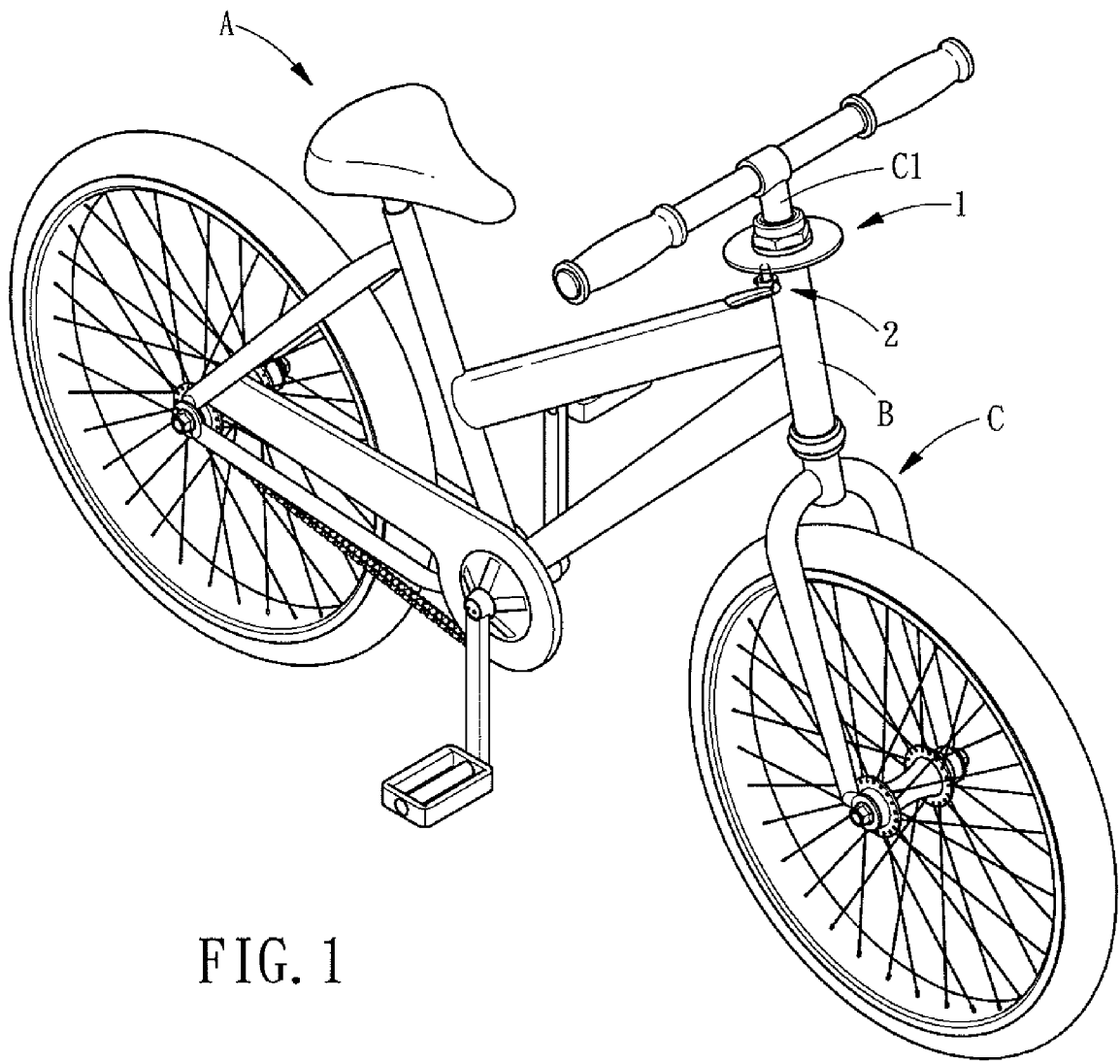
FIG. 1 is a perspective view of a positioning device for a bicycle handlebar in accordance with the present invention.
Figure 2:
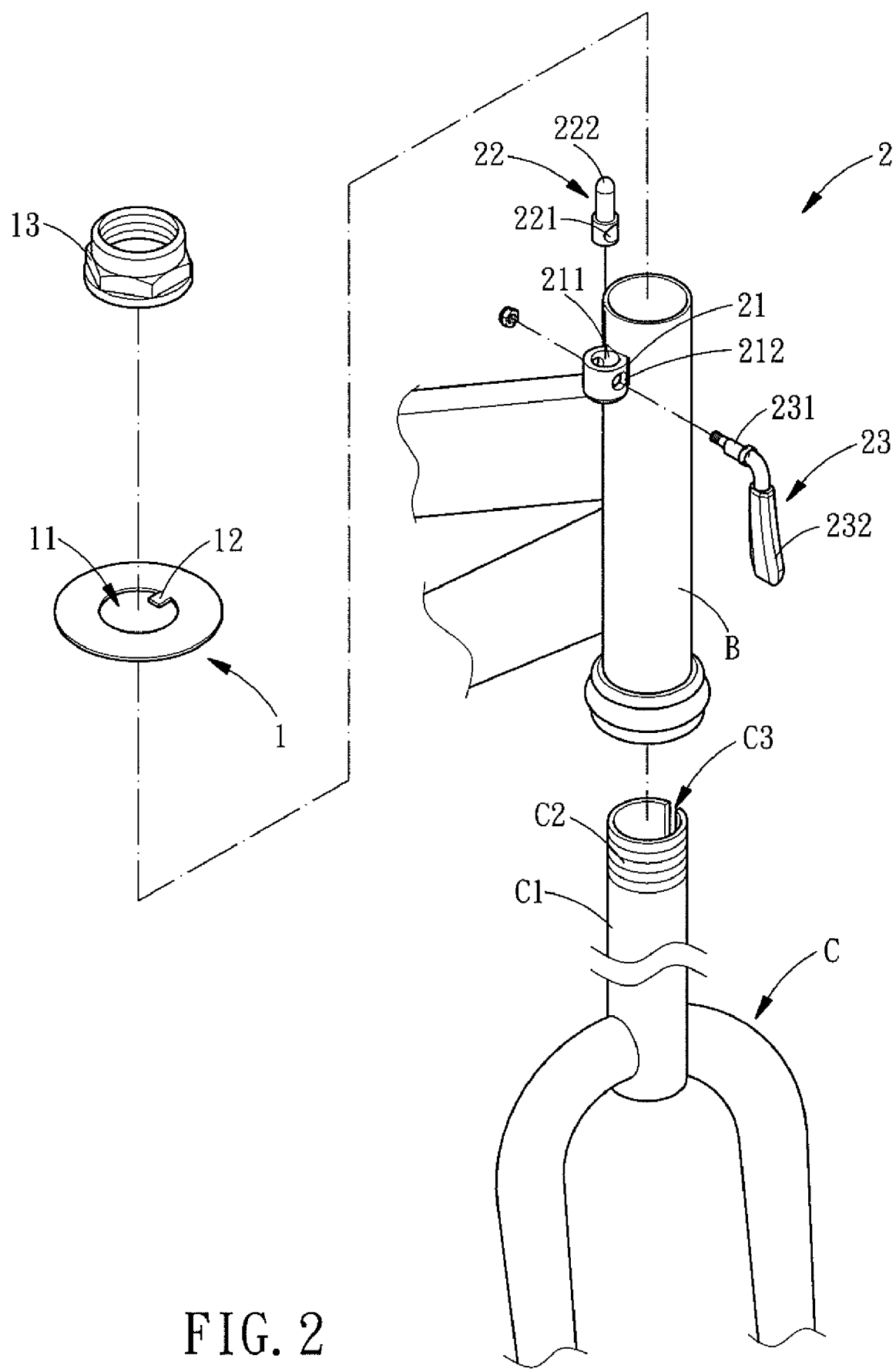
FIG. 2 is an exploded view of the positioning device for a bicycle handlebar in accordance with a better embodiment of the present invention.
Figure 3:
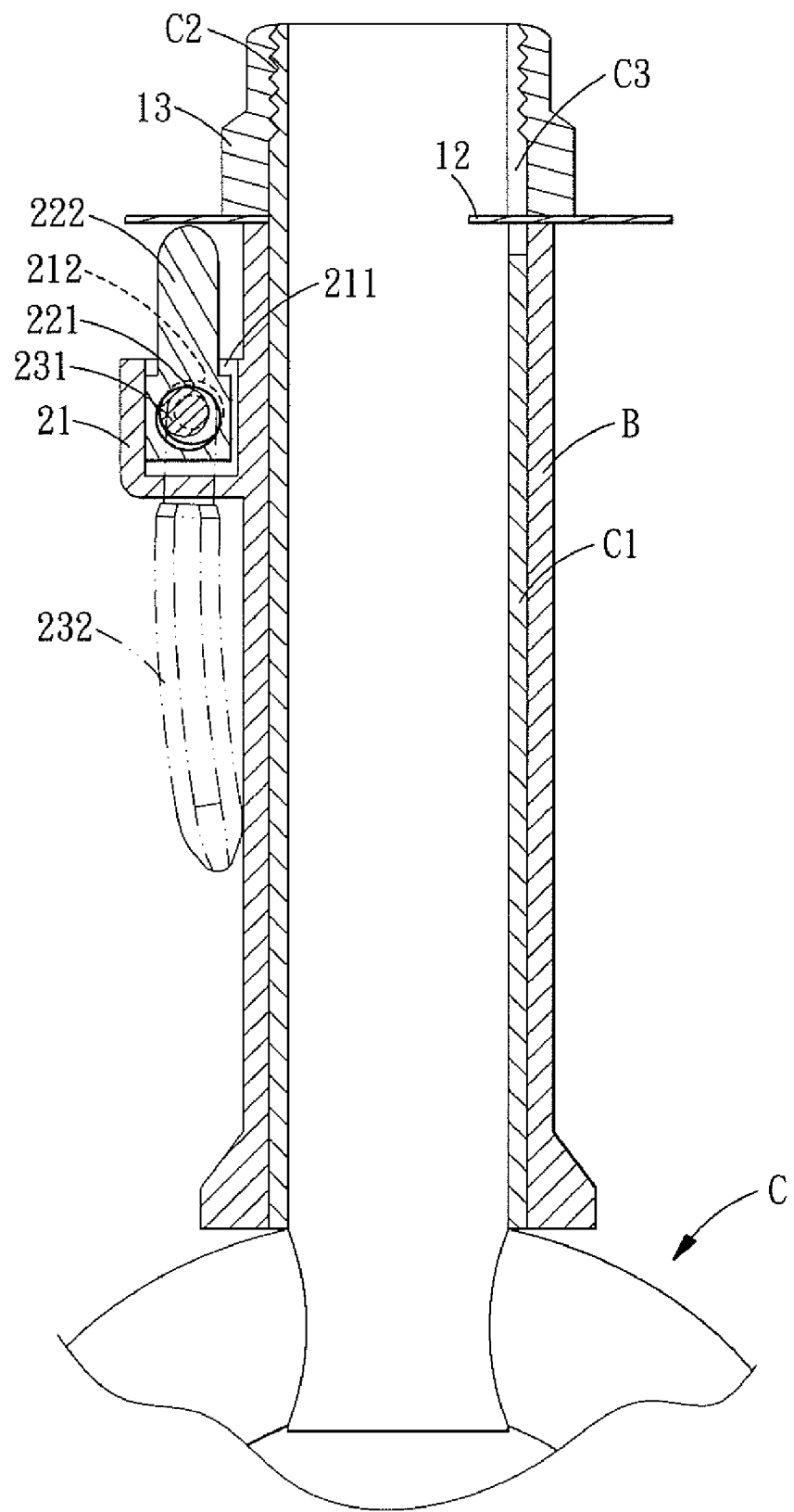
FIG. 3 is an assembly cross sectional view of the positioning device for a bicycle handlebar in accordance with the better embodiment of the present invention.

Referring to FIGS. 1-3, a positioning device for a bicycle handlebar in accordance with a first embodiment of the present invention comprises a positioning piece 1 and a pressing assembly 2, which is mounted on a front tube B and a front fork C of a bicycle A.

The stem wall of a front fork stem C1 of the front fork C is axially defined with an engaging groove C3; and a predetermined numbers of outer threads C2 are defined on a surface of the end of the front fork stem C1.

The positioning piece 1 is flexible and defined with a through hole 11 in the center thereof for receiving the front fork stem C1, thus positioning the positioning piece 1 to the front fork stem C1. A protruded block 12 is formed in the through hole 11 of the positioning piece 1 for engaging with the engaging groove C2 of the front fork stem C1. Furthermore, a screw 13 is screwed to the outer threads C2 of the front fork stem C1, so that the positioning piece 1 is fixed between the screw 13 and the front tube B.

The pressing assembly 2 includes a containing seat 21, a pressing member 22 and an operating handle 23. The containing seat 21 is fixed to the outer wall of the front tube B and is defined with a containing groove 211. A through hole 212 is formed in the containing groove 211 and is located in the radial direction thereof. The pressing member 22 is mounted in the containing groove 211 of the containing seat 21. A through hole 221 is formed in the pressing member 22 thereof, and a pressing end 222 of the pressing member 22 is abutted against the lower surface of the positioning piece 1.

The operating handle 23 is formed with an eccentric shaft 231 to be inserted in the through hole 212 of the containing seat 21 and the through hole 221 of the pressing member 22. An operating shaft 232 is connected to the eccentric shaft 231. Therefore, the pressing member 22 is positioned by turning the operating shaft 232 and the eccentric shaft 231.

Figure 10:
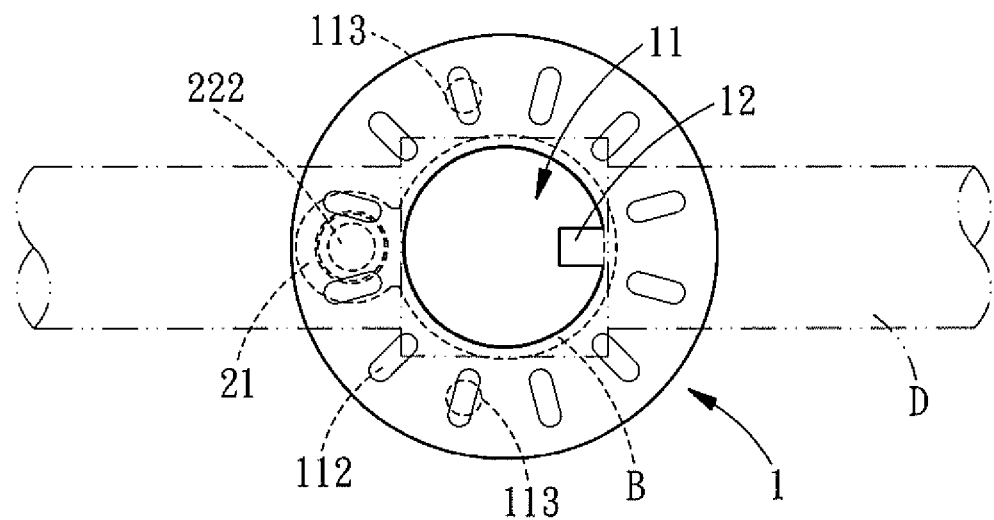
FIG. 10 is a perspective view of the positioning device for a bicycle handlebar in accordance with the better embodiment of the present invention.
Figure 11:
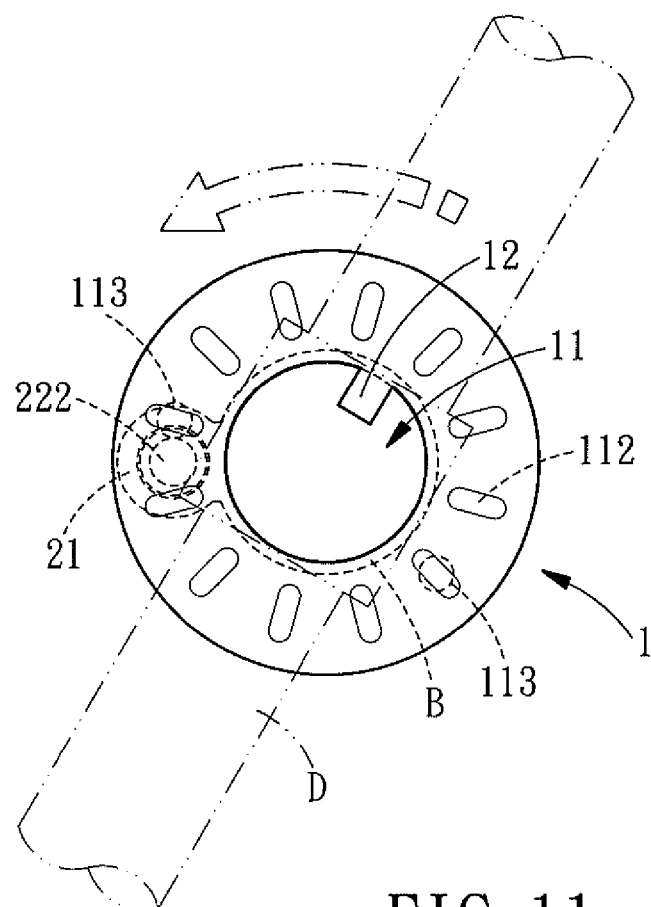
FIG. 11 is another perspective view of the positioning device for a bicycle handlebar in accordance with the better embodiment of the present invention.

A bicycle handlebar structure can be made by assembling such a positioning device and the bicycle handle D to the front fork stem C1 (as shown in FIG. 10).

Figure 4:
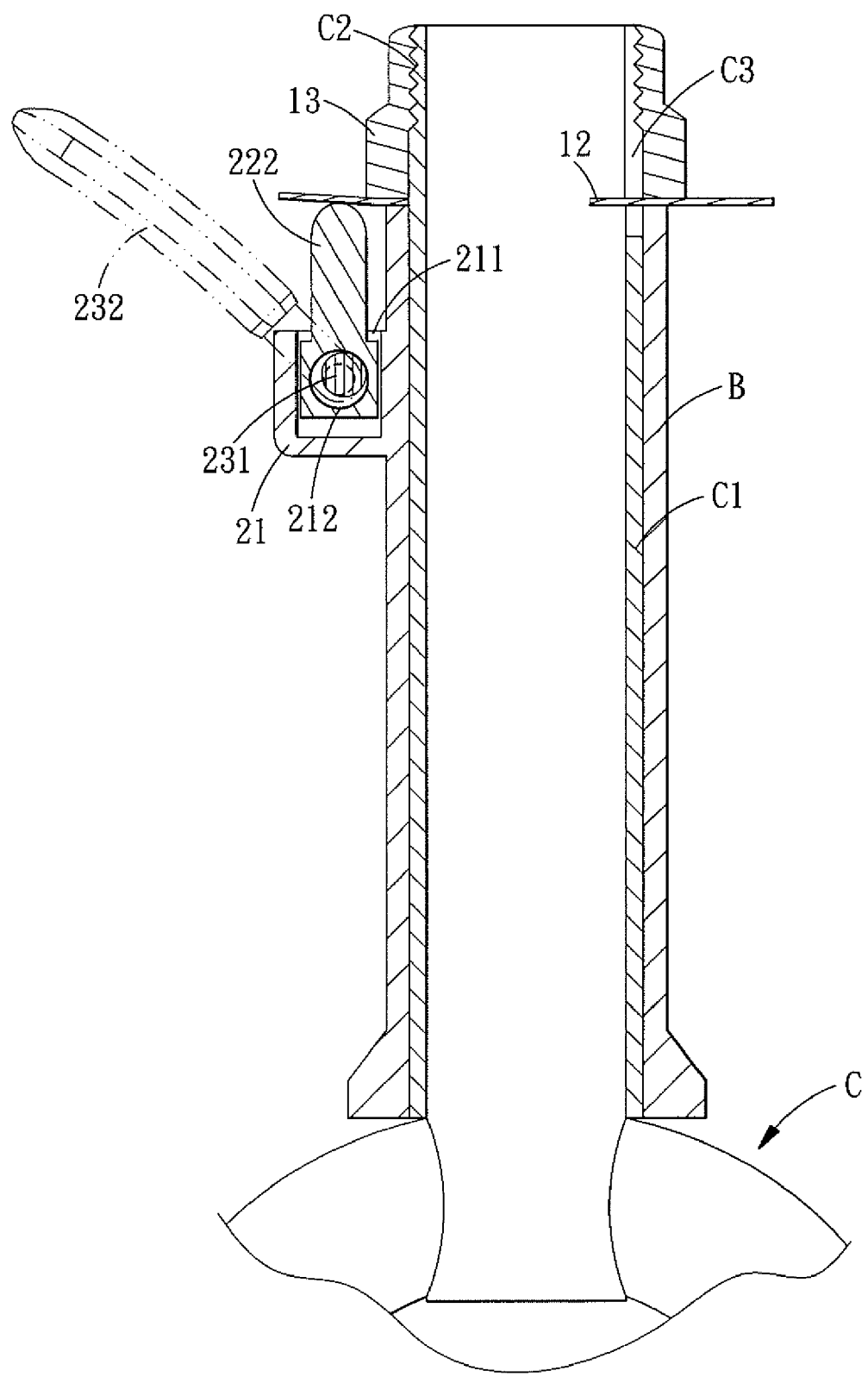
FIG. 4 is an operational view of the positioning device for a bicycle handlebar in accordance with the better embodiment of the present invention.

For a better understanding of the embodiment, its operation and function, reference should be made to FIG. 3 and FIG. 4.

FIG. 3 is a perspective view showing that the positioning piece 1 is not engaged with the pressing assembly 2. When in use, the bicycle A is parked properly firstly, with the handlebar turning to a suitable position (at an angle at which the handlebar is to be positioned, namely, the angle at which the bicycle is unlikely to fall).

After that, with reference to FIG. 4, the user can pull the operating shaft 232 of the pressing assembly 2 so as to rotate the eccentric shaft 231, thus axially lifting the pressing member 22 up and causing deformation of the positioning piece 1. Since the positioning piece 1 is flexible, an elastic resilience that is relative to the direction of pressing will be produced when the pressing member 22 is pressed. As a result, the positioning piece 1 and the pressing member 22 will be pressed and positioned more stably. Therefore, the front fork stem C1 will not pivotally rotate relative to the front tube B, and the handlebar can be positioned.

If a user wants to rotate the handlebar, he/she only needs to pull the operating shaft 232 of the pressing assembly 2, making the eccentric shaft 231 of the operating shaft 232 rotate. As a result, the pressing member 22 will be separated from the positioning piece 1, and the handlebar be rotated.

Figure 5:
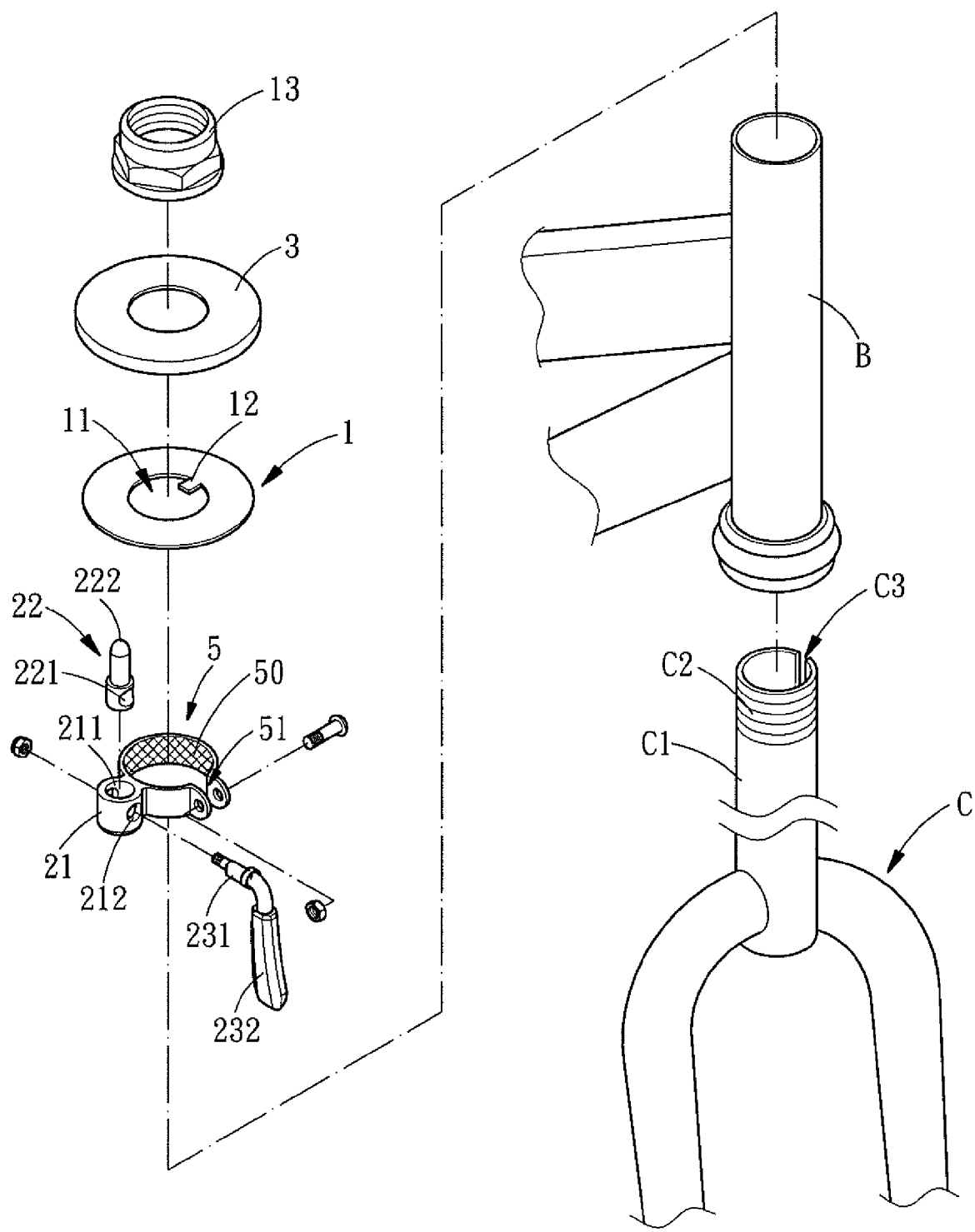
FIG. 5 is another exploded view of the positioning device for a bicycle handlebar in accordance with the better embodiment of the present invention.
Figure 6:
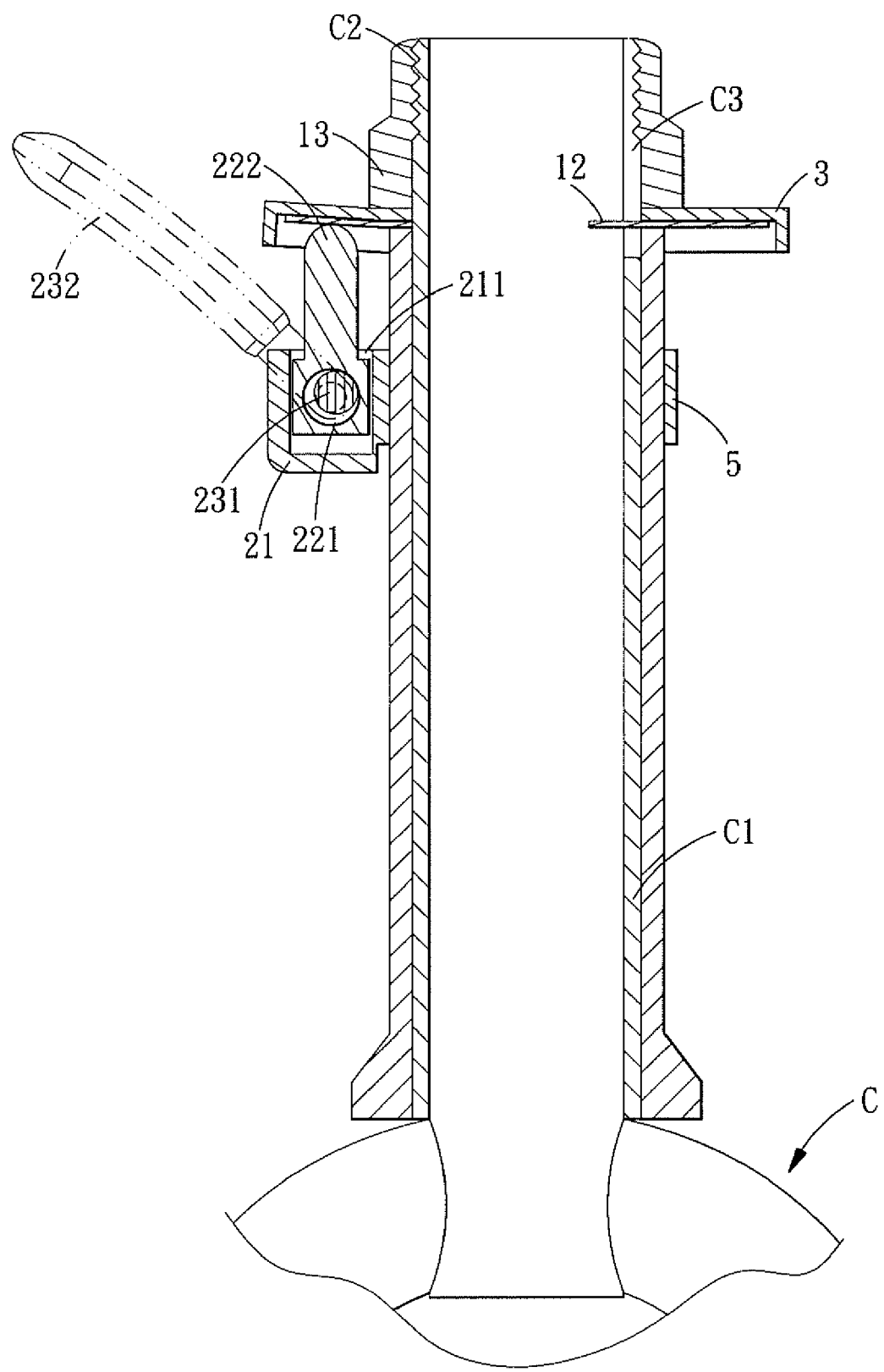
FIG. 6 is a partial cross sectional view of the positioning device for a bicycle handlebar in accordance with the better embodiment of the present invention.
Figure 7:
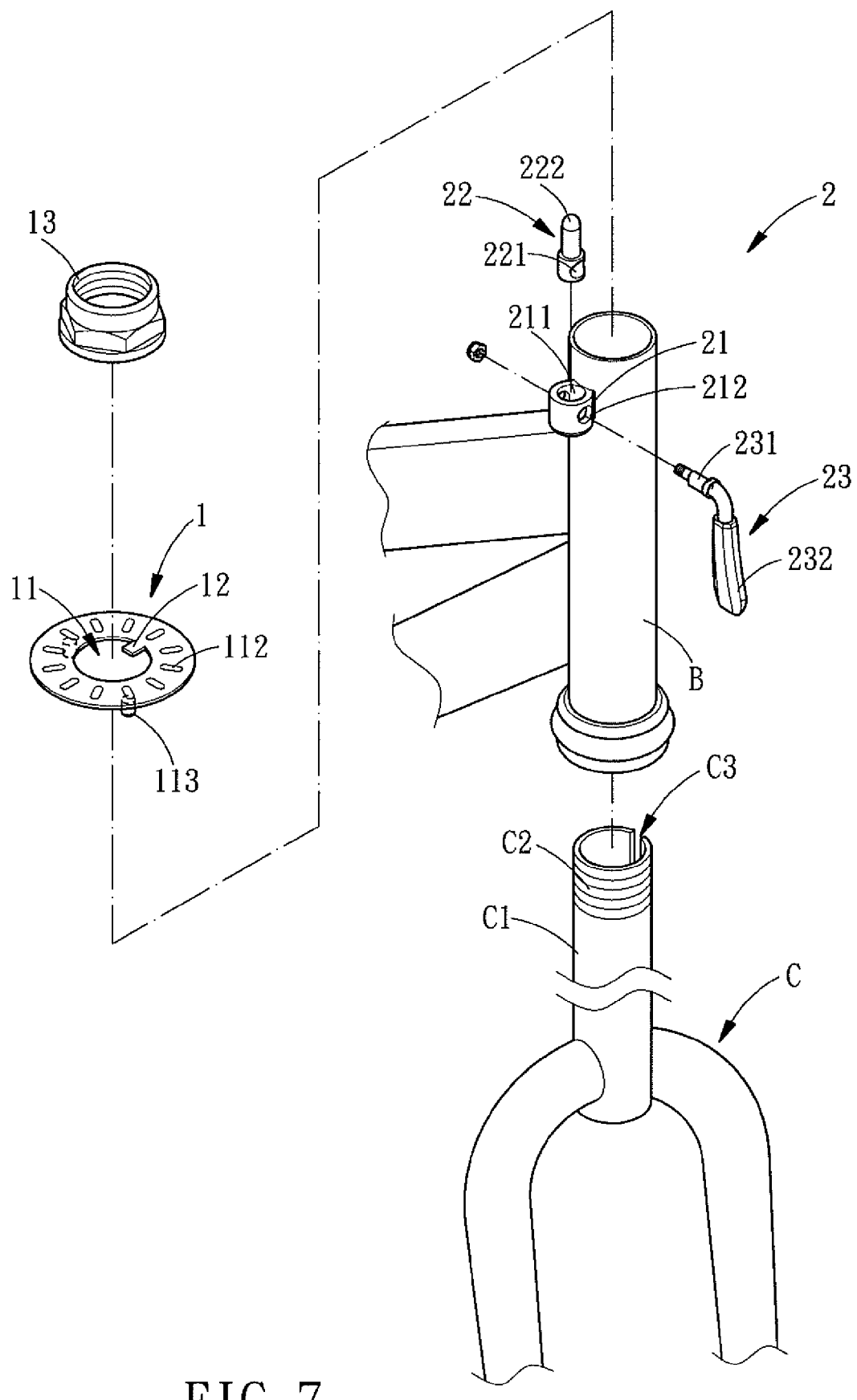
FIG. 7 is a further exploded view of the positioning device for a bicycle handlebar in accordance with the better embodiment of the present invention.
Figure 8:
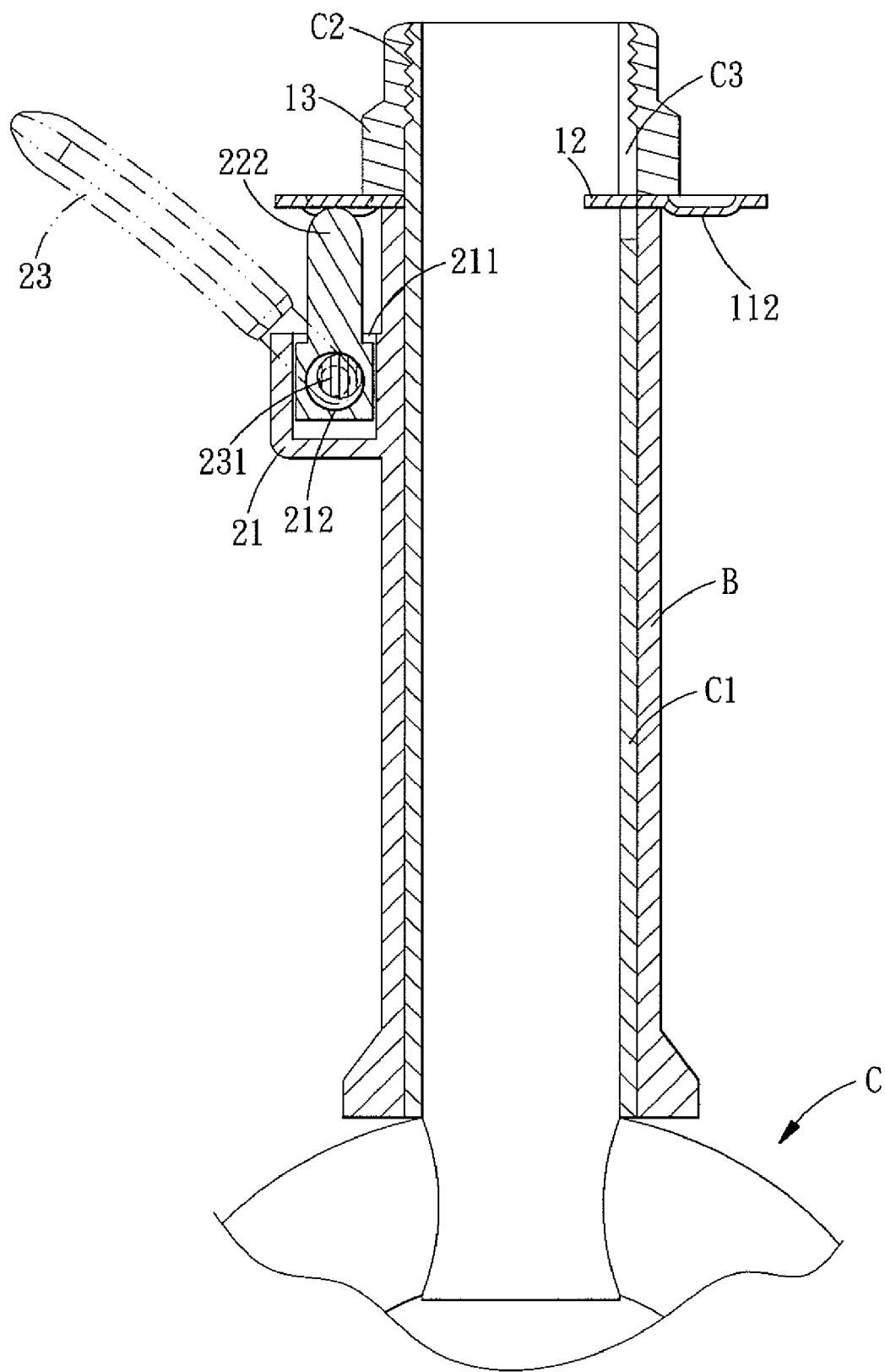
FIG. 8 is an assembly cross sectional view of the positioning device for a bicycle handlebar in accordance with the better embodiment of the present invention.
Figure 9:
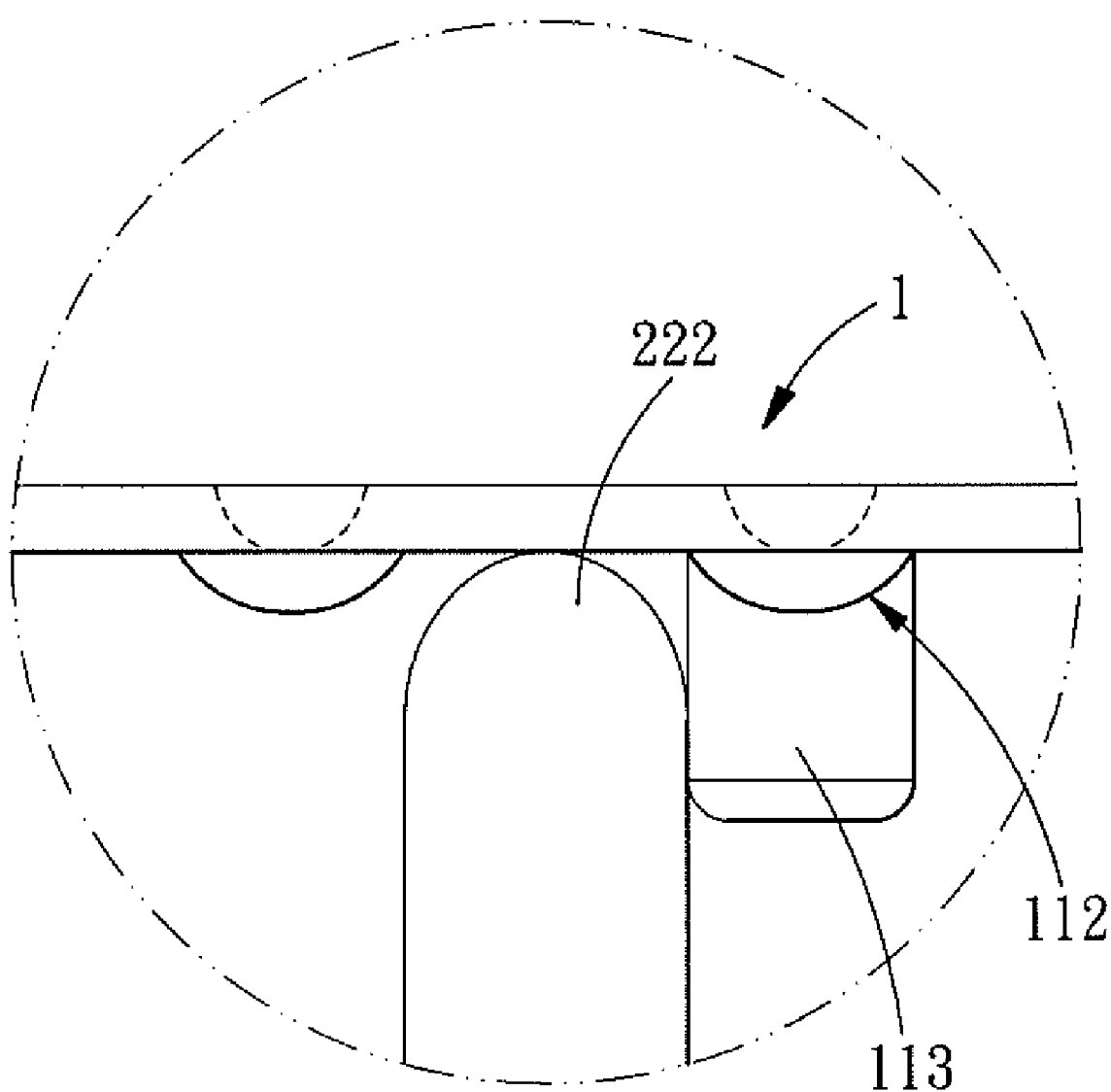
FIG. 9 is a partial enlarged view of the positioning device for a bicycle handlebar in accordance with the better embodiment of the present invention.

Referring further to FIGS. 5 and 6, a cover 3 can be mounted on the positioning piece 1 for covering the positioning piece 1. The containing seat 21 is fixed to the outer wall of the front tube B by a tightening member 5. The tightening member 5 is a ring-shaped member with a mouth 51 thereof. In the inner wall 50 of the tightening member 5 is defined with pressing designs that are connected to the front tube B by receiving the front tube B. Furthermore, a screw is inserted into both sides of the mouth 51, thus the pressing assembly 5 can be positioned to the front tube B stably. Note that either the cover 3 or the pressing assembly 5 is needed for this invention; they do not have to be both present to make this invention work.

When the positioning piece 1 is abutted against the cover 3 after being pressed by the pressing member 22 of the pressing assembly 2, the cover 3 will produce a driving force in a reverse direction, making the positioning piece 1 and the pressing member 22 being pressed and positioned more stably.

FIG. 7 to FIG. 11 illustrate how the positioning piece 1 of the present invention is made: on a lower surface of the positioning piece 1 are mounted a plurality of equally spaced protruded blocks 112; two of the protruded blocks 112 are mounted with a stopping block 113 each such that each stopping block 113 is located on the path that the pressing end 222 of the pressing assembly 2 moves relative to the positioning piece 1.

When a user rotates the bicycle handlebar D, the pressing assembly 2 is adjustably moving between the protruded blocks 112. Furthermore, when the positioning piece 1 is rotated by the bicycle handlebar D, the stopping blocks 113 is abutted against the pressing end 222 of the pressing assembly 2, restricting the rotating angle of the bicycle handlebar D, and hence reducing the chance of falling.

Figure 12:
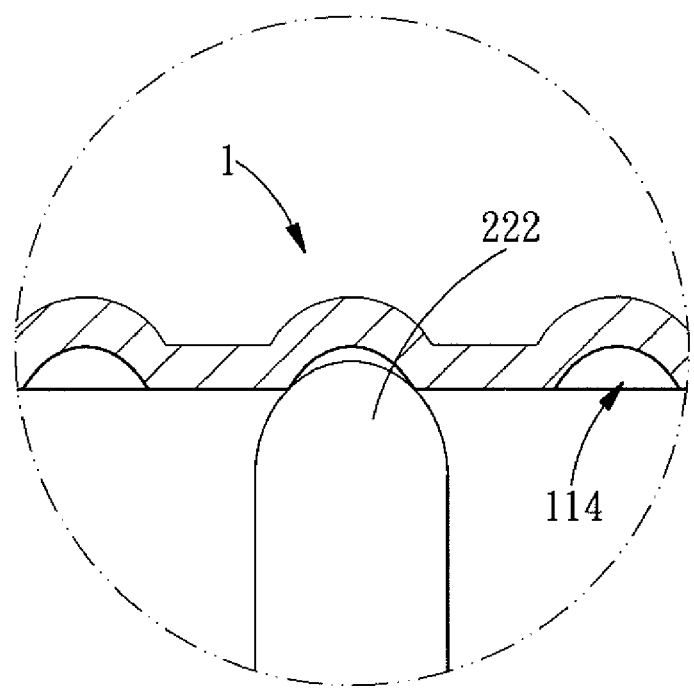
FIG. 12 is another partial enlarged view of the positioning device for a bicycle handlebar in accordance with the better embodiment of the present invention.

Furthermore, the positioning piece 1 of the present invention can be formed as shown in FIG. 12: on a lower surface of the positioning piece 1 are mounted a plurality of positioning recesses 114 that are equally spaced; two of the positioning recesses 114 are mounted with a stopping block 113 each such that each stopping block 113 is located at the path that the pressing end 222 of the pressing assembly 2 moves relative to the positioning piece 1. The pressing end 222 of the pressing assembly 2 is abutted against the edge of the positioning recess 114, since the positioning piece 1 is flexible, the pressing assembly 2 and the positioning piece 1 will be pressed to be positioned. And since each stopping block 113 is located on the path that the pressing end 222 of the pressing assembly 2 moves relative to the positioning piece 1, the pressing end 222 of the pressing assembly 2 is restricted to move between the stopping blocks 113.

Figure 13:
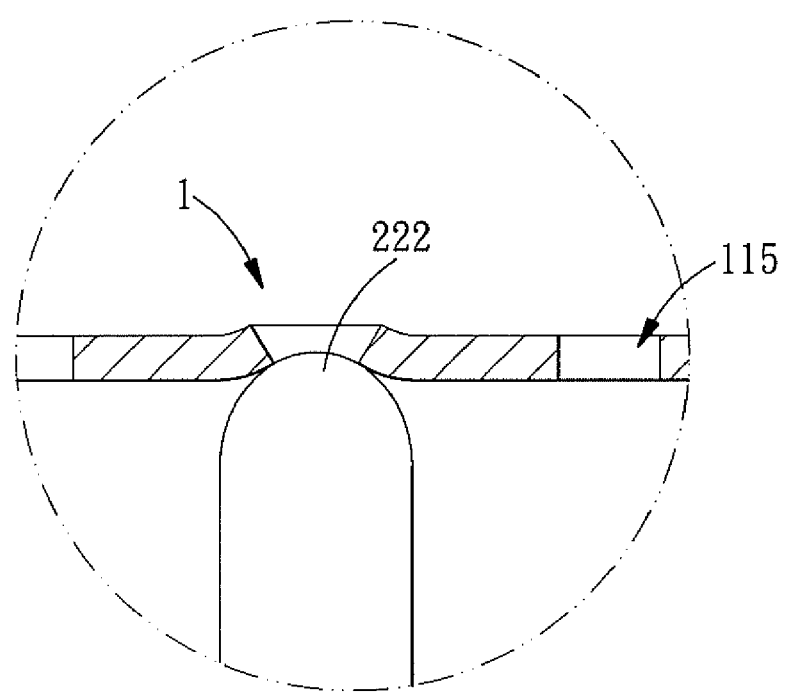
FIG. 13 is a further partial enlarged view of the positioning device for a bicycle handlebar in accordance with the better embodiment of the present invention.

Also, the positioning piece 1 of the present invention can be formed as shown in FIG. 13: on a lower surface of the positioning piece 1 are defined a plurality of through holes 115 that are equally spaced, and two of the through holes 115 are mounted with a stopping block 113 each such that each stopping block 113 is located on the path that the pressing end 222 of the pressing assembly 2 moves relative to the positioning piece 1. The pressing end 222 of the pressing assembly 2 is abutted against the edge of the through hole 115. Since the positioning piece 1 is flexible, the pressing assembly 2 and the positioning piece 1 will be pressed to be positioned. Since each stopping block 113 is located on the path that the pressing end 222 of the pressing assembly 2 moves relative to the positioning piece 1, the pressing end 222 of the pressing assembly 2 is restricted to move between the stopping blocks 113.

While we have shown and described various embodiments in accordance with the present invention, it should be clear to those of ordinary skills in the art that further embodiments may be made without departing from the scope of the present invention.

What is claimed is:

1. A positioning device for a bicycle handlebar, which is mounted on a front tube and a front fork stem of a bicycle, comprising:
   a positioning piece defined with a through hole in a center thereof for insertion of the front fork stem, thus positioning the positioning piece to the front fork stem; and
   a pressing assembly being fixed to the front tube and abutted against a lower surface of the positioning piece, and since the pressing assembly being engaged with the positioning piece, the front tube is not pivotally rotate relative to the front fork stem;
   wherein the stem wall of the front fork stem of the front fork is axially defined with an engaging groove, and a predetermined numbers of outer threads are defined in a surface of an end of the front fork stem, and a protruded block is formed in the through hole of the positioning piece for engaging with the engaging groove of the front fork stem, furthermore, a screw is screwed to the outer threads of the front fork stem, so that the positioning piece is fixed between the screw and the front tube.

2. The positioning device for a bicycle handlebar as claimed in claim 1, wherein the pressing assembly comprises:
   a containing seat being fixed to an outer wall of the front tube and defined with a containing groove, and a through hole is formed in the containing groove and is located in the radial direction thereof;
   a pressing member being mounted in the containing groove of the containing seat, a through hole is formed in the pressing member thereof, and a pressing end of the pressing member is abutted against the lower surface of the positioning piece; and an operating handle being mounted with an eccentric shaft to be inserted in the through hole of the containing seat and the through hole of the pressing member so as to position the pressing member.

3. The positioning device for a bicycle handlebar as claimed in claim 2, wherein in the lower surface of the positioning piece are mounted a plurality of protruded blocks that are equally spaced, and two of the protruded blocks are mounted with a stopping block respectively, so that each stopping block is located at a path that the pressing end of the pressing assembly is moved relative to the positioning piece.

4. The positioning device for a bicycle handlebar as claimed in claim 2, wherein in the lower surface of the positioning piece are mounted a plurality of positioning recesses that are equally spaced, and two of the positioning recesses are mounted with a stopping block respectively, so that each positioning recess is located at the path that the pressing end of the pressing assembly is moved relative to the positioning piece.

5. The positioning device for a bicycle handlebar as claimed in claim 2, wherein in the lower surface of the positioning piece are defined a plurality of through holes that are equally spaced, and two of the through holes are mounted with a stopping block respectively, so that each through hole is located at the path that the pressing end of the pressing assembly is moved relative to the positioning piece.

6. The positioning device for a bicycle handlebar as claimed in claim 1, wherein a cover is mounted on the positioning piece for covering the positioning piece 1.

7. The positioning device for a bicycle handlebar as claimed in claim 2, wherein the containing seat is fixed to the outer wall of the front tube by a tightening member, the tightening member is a ring-shaped member with a mouth thereof, and in an inner wall of the tightening member is defined with pressing designs that are connected to the front tube by receiving the front tube, furthermore, a screw is inserted into both sides of the mouth, thus the pressing assembly is positioned to the front tube stably.

* * * * *